(12) United States Patent
Dubrovin et al.

(10) Patent No.: US 8,332,546 B2
(45) Date of Patent: Dec. 11, 2012

(54) FULLY ASYNCHRONOUS DIRECT MEMORY ACCESS CONTROLLER AND PROCESSOR WORK

(75) Inventors: Leonid Dubrovin, Karney Shomron (IL); Alexander Rabinovitch, Kfar Yona (IL)

(73) Assignee: LSI Corporation, Milpitas, CA (US)

( * ) Notice: Subject to any disclaimer, the term of this patent is extended or adjusted under 35 U.S.C. 154(b) by 63 days.

(21) Appl. No.: 12/839,566

(22) Filed: Jul. 20, 2010

(65) Prior Publication Data

US 2012/0023271 A1 Jan. 26, 2012

(51) Int. Cl.
*G06F 3/00* (2006.01)
*G06F 13/28* (2006.01)
(52) U.S. Cl. .......................................... 710/10; 710/22
(58) Field of Classification Search ...................... 710/24
See application file for complete search history.

(56) References Cited

U.S. PATENT DOCUMENTS

| | | | | |
|---|---|---|---|---|
| 6,081,852 | A | * | 6/2000 | Baker ............................ 710/24 |
| 6,782,465 | B1 | | 8/2004 | Schmidt ....................... 711/208 |
| 7,415,550 | B2 | | 8/2008 | Tanaka et al. .................. 710/26 |
| 7,930,444 | B2 | * | 4/2011 | Shasha et al. ................... 710/22 |
| 8,001,430 | B2 | * | 8/2011 | Shasha et al. ................... 714/56 |
| 2003/0195990 | A1 | * | 10/2003 | Greenblat ..................... 709/251 |
| 2004/0243738 | A1 | * | 12/2004 | Day et al. ....................... 710/22 |
| 2005/0289253 | A1 | | 12/2005 | Edirisooriya et al. .......... 710/22 |
| 2007/0174509 | A1 | * | 7/2007 | Day et al. ....................... 710/22 |

* cited by examiner

*Primary Examiner* — Henry Tsai
*Assistant Examiner* — Titus Wong
(74) *Attorney, Agent, or Firm* — Christopher P. Maiorana, PC

(57) ABSTRACT

An apparatus generally having a processor and a direct memory access controller is disclosed. The processor may be configured to increment a task counter to indicate that a new one of a plurality of tasks is scheduled. The direct memory access controller may be configured to (i) execute the new task to transfer data between a plurality of memory locations in response to the task counter being incremented and (ii) decrement the task counter in response to the executing of the new task.

18 Claims, 3 Drawing Sheets

| | PROCESSORS | DMAC | TC | NOTE |
|---|---|---|---|---|
| 142 | PREPARE TASK_A | WAITING FOR NEW TASK | 0 | |
| 144 | PLACE TASK_A | -||- | 0 | |
| 146 | INCREMENT TC | -||- | 1 | TC INCREMENTED BY A PROC |
| 148 | PREPARE TASK_B | EXECUTE TASK_A | 0 | TC DECREMENTED BY DMAC |
| 150 | PLACE TASK_B | -||- | 0 | |
| 152 | INCREMENT TC | -||- | 1 | TC INCREMENTED BY A PROC |
| 154 | PREPARE TASK_C | -||- | 1 | |
| 156 | PLACE TASK_C | -||- | 1 | |
| 158 | INCREMENT TC | -||- | 2 | TC INCREMENTED BY A PROC |
| 160 | PREPARE TASK_D | EXECUTE TASK_B | 1 | TC DECREMENTED BY DMAC |
| 162 | PLACE TASK_D | EXECUTE TASK_C | 0 | TC DECREMENTED BY DMAC |
| 164 | INCREMENT TC | EXECUTE TASK_D | 1 | TC INCREMENTED BY A PROC |
| 166 | PREPARE TASK_E | -||- | 0 | TC DECREMENTED BY DMAC |
| 168 | PLACE TASK_E | WAITING FOR NEW TASK | 0 | |
| 170 | INCREMENT TC | -||- | 1 | TC INCREMENTED BY A PROC |
| 172 | PREPARE TASK_F | EXECUTE TASK_E | 0 | TC DECREMENTED BY DMAC |

FIG. 3

FULLY ASYNCHRONOUS DIRECT MEMORY ACCESS CONTROLLER AND PROCESSOR WORK

FIELD OF THE INVENTION

The present invention relates to direct memory access transfers generally and, more particularly, to a method and/or apparatus for implementing fully asynchronous direct memory access controller (DMAC) and processor work.

BACKGROUND OF THE INVENTION

A Direct Memory Access Controller (DMAC) is a common device used to transfer blocks of data between memory locations. The DMAC is used to reduce the workload from a processor and make memory transfers automatic. A conventional digital signal processor subsystem DMAC uses memory located data structures to program the DMAC. Descriptors in the data structures contain information to program the DMAC registers for a single block transfer. Once the descriptors are loaded into the data structures, the DMAC is activated by the processor.

A single activation causes the DMAC to execute a single task defined by the descriptors. To initiate the DMAC for the next task execution, the processor monitors the DMAC for completion of the active task. Monitoring by the processor involves either receiving an interrupt signal from the DMAC or by polling a status register of the DMAC.

Both monitoring procedures consume many processor cycles, especially when the processor produces many "small" tasks for the DMAC. In addition, the initialization of each new task for the DMAC reduces an operating efficiency of the DMAC. In particular, a new task might be added only when execution of the previous task has completed. If the DMAC is used to copy data between input and output buffers of hardware accelerators, the processor should be always used for synchronization between the tasks.

SUMMARY OF THE INVENTION

The present invention concerns an apparatus generally having a processor and a direct memory access controller. The processor may be configured to increment a task counter to indicate that a new one of a plurality of tasks is scheduled. The direct memory access controller may be configured to (i) execute the new task to transfer data between a plurality of memory locations in response to the task counter being incremented and (ii) decrement the task counter in response to the executing of the new task.

The objects, features and advantages of the present invention include providing a method and/or apparatus for implementing fully asynchronous direct memory access controller and processor work that may (i) use a special indication to mark the end of each task, (ii) use a dedicated register to store and to update the number of tasks generated by the processor and waiting for the DMA execution, (iii) reduce or fully eliminate processor cycles spent for the DMAC status monitoring and initialization procedures, (iv) allow the processor to add a new task whenever the task is ready, (v) allow the processor to add a new task before the DMAC has finished execution of the previous task, (vi) allow the processor to prepare tasks for hardware accelerators and/or (vii) make data copying between the input and output buffers of the hardware accelerators fully automatic.

BRIEF DESCRIPTION OF THE DRAWINGS

These and other objects, features and advantages of the present invention will be apparent from the following detailed description and the appended claims and drawings in which:

FIG. 3 is a table illustrating an example flow of task processing.

DETAILED DESCRIPTION OF THE PREFERRED EMBODIMENTS

Figure 1:
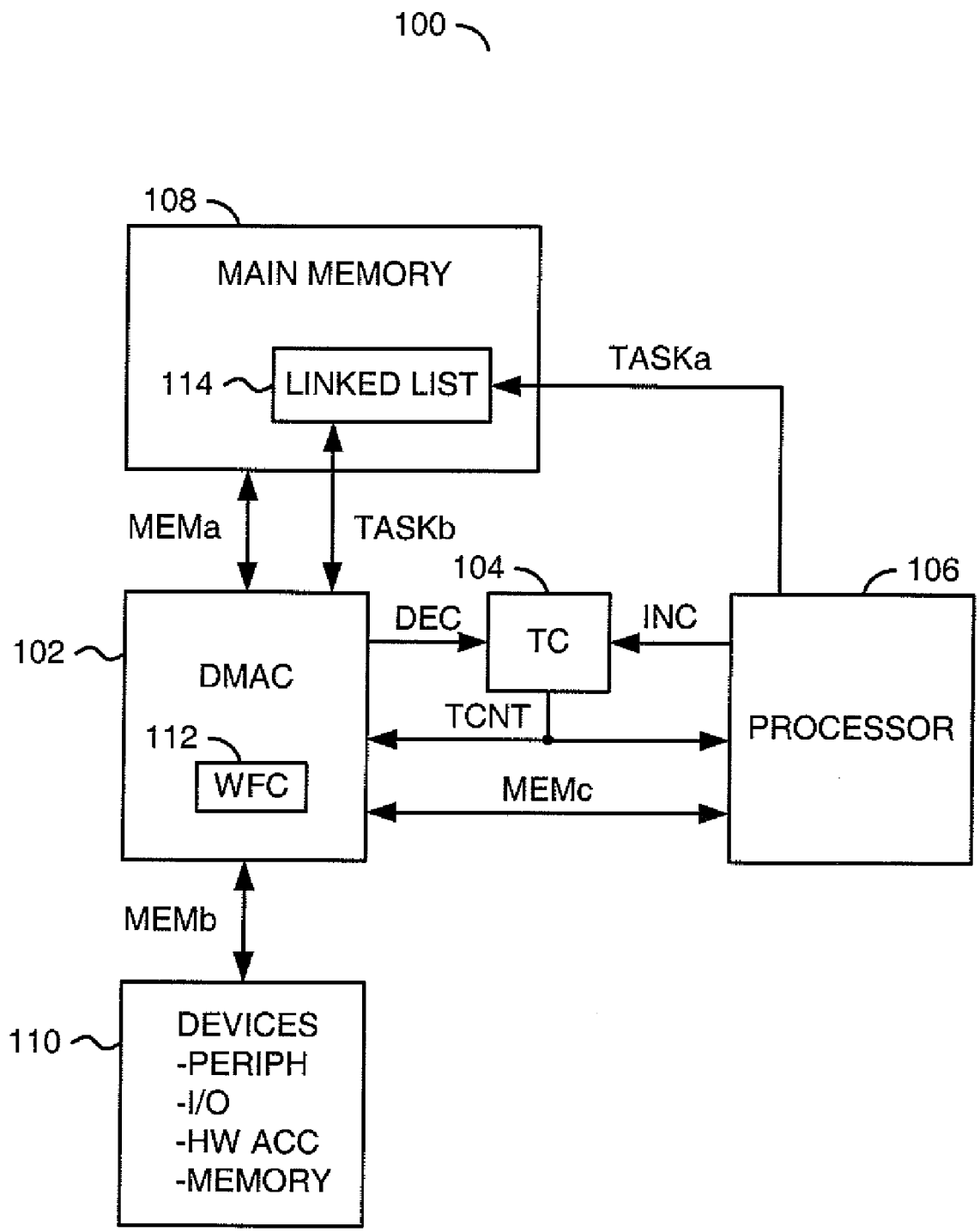
FIG. 1 is a functional block diagram of an apparatus in accordance with a preferred embodiment of the present invention.

Referring to FIG. 1, a functional block diagram of an apparatus 100 is shown in accordance with a preferred embodiment of the present invention. The apparatus (or device) 100 generally comprises a circuit (or module) 102, a circuit (or module) 104, one or more circuits (or modules) 106, a circuit (or module) 108 and one or more circuits (or modules) 110. A signal (e.g., MEMa) may be exchanged between the circuit 102 and the circuit 108. A signal (e.g., MEMb) may be exchanged between the circuit 102 and the circuit 110. The circuit 102 may exchange a signal (e.g., MEMc) with the circuit 106. The circuit 102 may generate and transfer a signal (e.g., DEC) to the circuit 104. The circuit 104 may generate a signal (e.g., TCNT) received by both the circuit 102 and the circuit 106. A signal (e.g., INC) may be generated by the circuit 106 and received by the circuit 104. A signal (e.g., TASKa) may be generated and transferred from the circuit 106 to the circuit 108. The circuit 108 may generate a signal (e.g., TASKb) received by the circuit 102. The circuits 102 to 110 may represent modules and/or blocks that may be implemented as hardware, firmware, software, a combination of hardware, firmware and/or software, or other implementations.

The circuit 102 may implement a Direct Memory Access Controller (DMAC) circuit. The circuit 102 is generally operational to transfer blocks of data between addressable locations via the signals MEMa, MEMb and/or MEMc. The addressable locations may be entirely within the circuit 108 or entirely within the circuit 110. The addressable locations may also be separated between (i) the circuit 108 and the circuit 106, (ii) the circuit 110 and the circuit 106 and/or (iii) the circuit 108 and the circuit 110. Transfers of the data blocks may be governed by task descriptors received in the signal TASKb. The circuit 102 may include a status register (or circuit) 112. The register 112 may store information (e.g., a bit) indicating the condition of the circuit 102. The stored information may be referred to as a Wait For Counter (WFC) indicator. A busy condition (e.g., a digital LOW, or 0) in the register 112 may indicate that the circuit 102 is busy executing a current task. A wait condition (e.g., a digital HIGH, or 1) stored in the register 112 generally indicates that the circuit 102 has finished executing the current task and is waiting for a next task to become available.

The circuit 104 may implement a task counter register circuit. The circuit 104 is generally operational to store a task counter value (e.g., TC). The value TC may indicate the number of outstanding tasks that the circuit 102 has yet to begin processing. The value TC stored in the circuit 104 may be read by the circuits 102 and 106 via the signal TCNT. The signal INC may be used by the circuit 106 to write a new (e.g., incremented) version of the value TC into the circuit 104. The signal DEC may be used by the circuit 102 to write a new (e.g., decremented) version of the value TC into the circuit 104. In some embodiments, the circuit 104 may be part of the circuit 102.

The circuit 106 generally implements one or more processor circuits. Each circuit 106 may be operational to generate one or more data transfer tasks to be performed by the circuit 102. Each data transfer may be defined by one or more descriptors. One or more descriptors may be grouped into a task. The circuit 106 may queue (schedule) the tasks by writing the task descriptors into the circuit 108 via the signal TASKa. Once a task has been stored in the circuit 108, the circuit 106 may increment the value TC, once for each new task placed in the circuit 108.

The circuit 108 generally implements a main memory circuit. The circuit 108 may be operational to store data, commands, tasks and other information used by the circuit 102, the circuit 106, the circuit 110 and optionally other circuitry of the apparatus 100. The circuit 108 generally includes a reserved address range, referred to as a list 114. The list 114 may be configured as a linked list of the data transfer tasks. New tasks may be added to the list 114 by the circuit 106 via the signal TASKa. Tasks buffered in the list 114 may be conveyed to the circuit 102 via the signal TASKb.

The circuit 110 may implement one or more addressable memory spaces of various devices in the apparatus 100. The circuit 110 may include, but is not limited to, peripheral devices (or circuits), input/output devices (or circuits), hardware accelerator devices (or circuits) and additional memory devices (or circuits). Each individual device within the circuit 110 may include an addressable memory range accessible by the circuit 102 and the circuit 106.

During normal operation, the circuit 106 may produce task descriptors for the data transfer tasks. The task descriptors may be placed in the list 114. The last task descriptor of each task is generally marked with a special indication bit (e.g., an end_of_task bit). The last task descriptor of each task may also point to a memory location within the list 114 where a beginning of a next task may be placed. A sequence of pointers from each task to a subsequent task generally forms the linked list. The number of tasks yet to be performed may be stored in the circuit 104.

When a new task is prepared, the descriptors of the new task may be added to the linked list. The value TC in the circuit 104 may be updated (e.g., incremented) via the signal INC. When execution of a current task is initiated by the circuit 102, the value TC in the circuit 104 may be changed (e.g., decremented) via the signal DEC. If the value TC is a zero value (e.g., a null value or start value), the circuit 102 may finish a current task (if in progress) then stop and wait until the value TC becomes greater than zero. A non-zero task counter value generally means that at least one new task has been added to the list 114. In response to the non-zero task counter value, the circuit 102 may read the newly added task from the list 114 via the signal TASKb and execute the newly added task.

Figure 2:
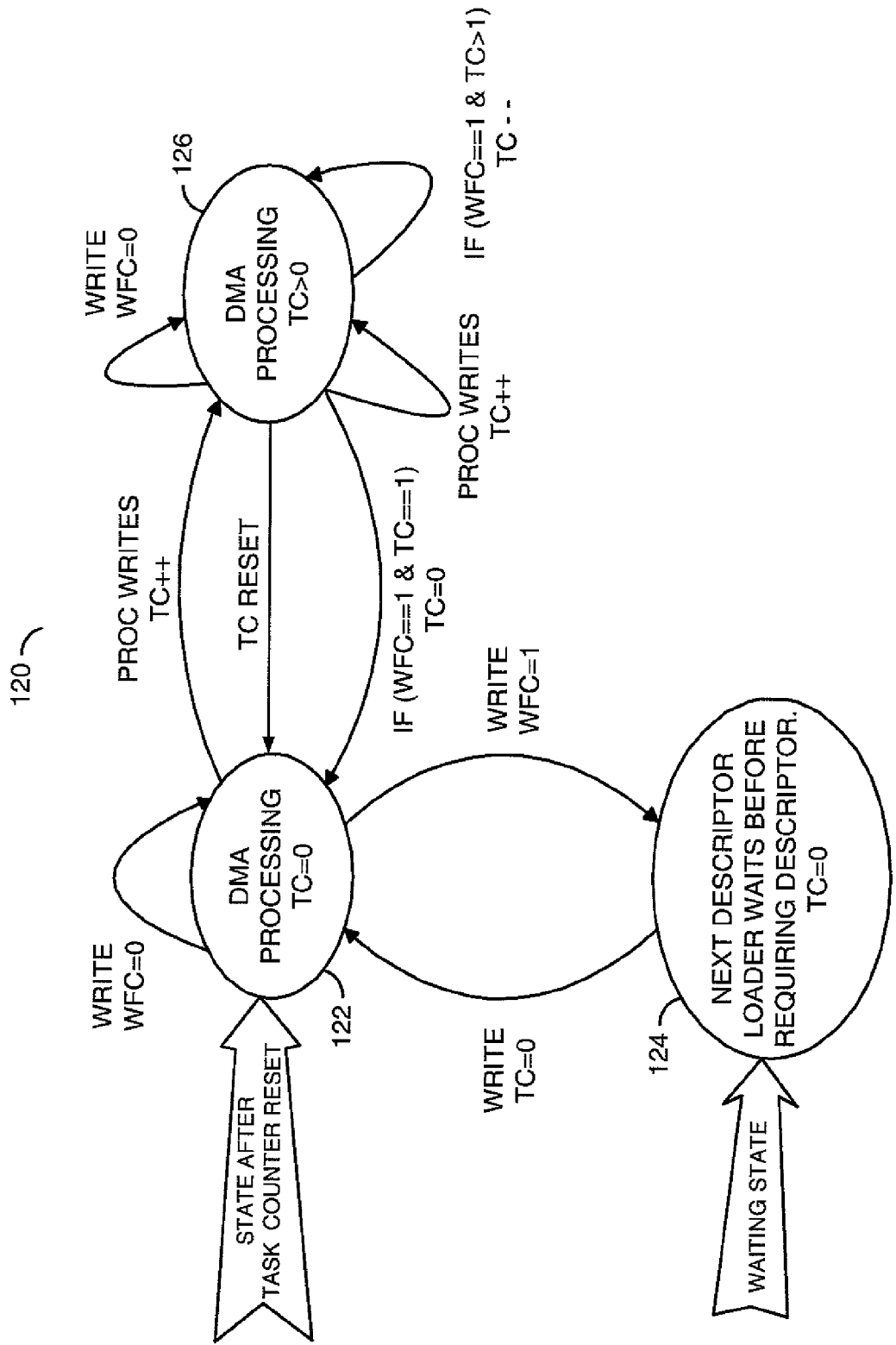
FIG. 2 is a state transition diagram for a state of a Direct Memory Access Controller.

Referring to FIG. 2, a state transition diagram 120 for a state of the circuit 102 is shown. The diagram 120 generally comprises a state (or mode) 122, a state (or mode) 124 and a state (or mode) 126. The states 122-126 may be implemented by a state machine, dedicated circuitry and/or one or more processors within the circuit 102.

State 122 may operate as an execution state. The state 122 may be the initial state of the circuit 102 on power-up and/or upon reset. Reset may be signaled by an assertion of a reset signal and/or a reset bit. While in the state 122, the circuit 102 may check the value TC stored in the circuit 104. If the value TC is a zero value, no tasks may be available for the circuit 102 to process. Therefore, the circuit 102 may transition from the state 122 to the state 124. As part of the transition, the circuit 102 may set the value WFC in the register 112 to the wait condition (e.g., 1).

If the value TC is a non-zero value (e.g., TC>zero), the circuit 102 may obtain a new task from the list 114 and begin execution of a new data transfer. The circuit 102 may also set the value WFC to the busy condition (e.g., 0) and decrement the value TC in the circuit 104.

Upon completion of the new data transfer task, the circuit 102 may perform another check of the value TC. If the value TC is still a non-zero value, the circuit 102 may remain in the state 122, read the next task from the list 144 and execute the next task. The value WFC may remain in the busy condition. If the value TC is zero, the circuit 102 may transition from the state 122 to the state 124 and set the value WFC to the wait condition.

State 124 may be operate as a wait state. While in the state 124, the value TC may be zero. A next descriptor loader of the circuit 102 may wait for the value TC to become non-zero. Once the value TC becomes non-zero, the next descriptor loader of the circuit 102 may load a new task from the list 114 and the circuit 102 may transition from the state 124 back to the state 122. During the transition to the state 122, the circuit 102 may decrement the value TC. In the state 122, the circuit 102 may execute the data transfers of the new task.

State 126 may operate as an execution state. If the circuit 106 increments the value TC (e.g., TC++) while the circuit 102 is in the state 122, the circuit 122 may transition from the state 122 to the state 126. In the state 126, the circuit 102 may continue executing the current task that was in progress at the time of the transition.

Once execution of the current task has completed in the state 126, the circuit 102 may set the value WFC to the wait condition and check the value TC. If both (i) the value WFC is the wait condition and (ii) the value TC indicates that a single task remains, the circuit 102 may transition from the state 126 back to the state 122. As part of the transition, the circuit 102 may decrement the value TC back to zero. From the state 122, the last remaining task descriptor may be retrieved from the list 114, the corresponding data transfers may be execution and the value WFC may be set to the busy condition. If the reset signal and/or the reset bit is asserted, the circuit 102 may transfer to the state 122 and recheck the value TC.

Upon completion of the current task, the circuit 102 in the state 126 may sometimes find that the value TC is greater than one, indicating that two or more tasks remain in the list 114. In such a case, if both (i) the value WFC is the wait condition and (ii) the value TC is greater than one, the circuit 102 may load the next task from the list 114 and decrement the value TC. Afterwards, processing of the newly loaded task may take place.

In some embodiments, multiple circuits 104 may be implemented in the apparatus 100. For example, if the end_of_task bit is doubled and two circuits 104 are created, the data copying between the input buffers and output (I/O) buffers of the circuit 110 (e.g., I/O buffers of hardware accelerators) and buffers of the circuit 106 may be done autonomously by the circuit 102.

Referring to FIG. 3, a table illustrating an example flow 140 of task processing is shown. The flow (or method) 140 may be implemented by the apparatus 100. Each period (or row) 142-172 of the flow 140 generally represents a processing time period. The periods 142-172 may have different actual durations from each other.

As illustrated in period 142, the circuit 106 may prepare a task (e.g., TASK_A) while the circuit 102 waits for a new task (e.g., state 124) and the value TC is zero. During period 144, the circuit 106 may place TASK_A into the list 114. The circuit 106 may subsequently increment the value TC from zero to one in the period 146. In period 148, the circuit 106 may prepare another task (e.g., TASK_B). The circuit 102 may transition from the state 124 to the state 122 due to the increment of the value TC. In the period 148, the circuit 102 may access TASK_A from the list, decrement the value TC and begin execution of TASK_A.

In period 150, the circuit 106 may load TASK_B into the list 114. Execution of TASK_A by the circuit 102 may continue in period 150 due to the size of the data transfer and/or speed of the circuitry involved in the example transfer. Once TASK_B has been loaded into the list 114, the circuit 106 may increment the value TC in period 152. The circuit 102 may transition from state 122 to state 126 due to the increment of the value TC and continue executing TASK_A in the period 152.

During period 154, the circuit 106 may prepare a new task (e.g., TASK_C) while the circuit 102 continues executing TASK_A. TASK_C is generally linked into the list 114 in period 156. The value TC may be incremented by the circuit 106 in period 158. Per the example, execution of TASK_A by the circuit 102 may finish during the period 158. In period 160, the circuit 106 may prepare yet another task (e.g., TASK_D). In parallel (simultaneously) to the preparation of TASK_D, the circuit 102 may read TASK_B from the list 114, decrement the value TC and begin execution of TASK_B.

TASK_B is relatively short in the example. Therefore, the circuit 102 may finish executing TASK_B in the period 160. As such, the circuit 102 may transition from state 126 to state 122 and begin processing TASK_C in period 162. The circuit 102 generally decrements the value TC back to zero as part of the transition. During the period 162, the circuit 106 may place TASK_D in the list 114. The circuit 106 may increment the value TC in the period 164 while the circuit 102 is still executing TASK_C. Incrementing the value TC while in state 122 generally causes the circuit 102 to transition from state 122 to state 126.

In period 166, the circuit 102 may finish processing TASK_C, transition from state 126 to state 122, begin processing TASK_D and decrement the value TC to zero. The circuit 106 may prepare yet another task (e.g., TASK_E) during the period 166. If the circuit 102 finishes TASK_D and the value TC is zero during the period 168, the circuit 102 generally transitions to state 124 and waits for a new task. The circuit 106 may use the period 168 to place TASK_E in the list 114. In period 170, the circuit 106 generally increments the value TC. In period 172, the circuit 102 may transition from state 124 to state 122, decrement the value TC and begin processing TASK_E. Meanwhile, the circuit 106 may prepare another task (e.g., TASK_F) as part of the period 172. The sequences of preparing tasks, placing the tasks into the list 114 and incrementing the value TC may be repeated by the circuit 106 in subsequent periods. The sequence of reading a task from the list 114, decrementing the value TC and executing the just-read task may be repeated by the circuit 102 in the subsequent periods.

Some embodiments of the present invention generally define an approach for fully asynchronous DMAC and processor work. An indicator (e.g., end_of_task bit) may be used to mark the end of each task. A dedicated register in a programming model of the circuit 102 may be used to store and to update the number of tasks generated by one or more processors and awaiting execution. Some embodiments generally reduce or fully eliminate processor cycles of the circuit 106 spent for (i) status monitoring of the circuit 102 and/or (ii) initialization procedures for the circuit 102. The circuit 106 may also add a new task to the list 114 whenever the task is ready, rather than only when the circuit 102 has finished execution of the previous task. Furthermore, the circuit 106 may prepare tasks for hardware accelerators that make data copying between the input buffers and output buffers of the hardware accelerators fully automatic.

The functions performed by the diagrams of FIGS. 1 and 2 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising: a processor configured to (i) generate a first signal conveying a new one of a plurality of tasks to a memory and (ii) generate a second signal that causes a task counter to increment to indicate that said new task is scheduled, wherein said second signal is generated after said new task is stored in said memory; and a direct memory access controller configured to (i) execute said new task to transfer data between a plurality of memory locations in response to an absence of a predetermined value in said task counter, (ii) decrement said task counter in response to said executing of said new task, and (iii) wait to receive a next of said tasks in response to said task counter having said predetermined value; and wherein said processor is further configured to asynchronously increment said task counter to indicate that an additional one of said tasks is scheduled without monitoring said execution of said new task.

2. The apparatus according to claim 1, wherein (i) said processor is further configured to add said new task to a linked list in said memory before said increment of said task counter and (ii) said memory is external to said direct memory access controller.

3. The apparatus according to claim 2, wherein said processor is further configured to add said additional one of said tasks to said linked list while said execution of said new task is ongoing.

4. The apparatus according to claim 1, wherein said direct memory access controller is further configured to (i) read said new task from said memory and (ii) set an indicator to a busy condition during said execution of said new task.

5. The apparatus according to claim 4, wherein said direct memory access controller is further configured to set said indicator to a wait condition in response to finishing said execution of said new task.

6. The apparatus according to claim 1, wherein said direct memory access controller is further configured to (i) transition from a wait state to a first execute state in response to said task counter being incremented by said processor and (ii) decrement said counter during said transition.

7. The apparatus according to claim 6, wherein said direct memory access controller is further configured to transition from said first execute state to a second execute state in response to said task counter being further incremented by said processor.

8. The apparatus according to claim 7, wherein said direct memory access controller is further configured to (i) transition from said second execute state to said first execute state in response to finishing said execution of all but one of said tasks and (ii) decrement said counter during said transition from said second execute state.

9. The apparatus according to claim 7, wherein said direct memory access controller is further configured to transition from said first execute state to said wait state in response to finishing said execution of all of said tasks.

10. A method for asynchronous direct memory access controller and processor work, comprising the steps of: (A) generating a first signal with said processor conveying a new one of a plurality of tasks to a memory; (B) generating a second signal with said processor that causes a task counter to increment to indicate that said new task is scheduled, wherein said second signal is generated after said new task is stored in said memory; (C) executing said new task to transfer data between a plurality of memory locations in response to an absence of a predetermined value in said task counter; (D) decrementing said task counter with said direct memory access controller in response to said executing of said new task; (E) waiting to receive a next of said tasks in response to said task counter having said predetermined value; and (F) asynchronously incrementing said task counter to indicate that an additional one of said tasks is scheduled without monitoring said execution of said new task with said processor.

11. The method according to claim 10, further comprising the step of:
adding said new task to a linked list in said memory before said incrementing of said task counter, wherein said memory is external to said direct memory access controller.

12. The method according to claim 11, further comprising the step of: adding said additional one of said tasks to said linked list while said execution of said new task is ongoing.

13. The method according to claim 10, further comprising the steps of:
reading said new task from said memory; and
setting an indicator to a busy condition during said executing of said new task.

14. The method according to claim 13, further comprising the step of:
setting said indicator to a wait condition in response to finishing said executing of said new task.

15. The method according to claim 10, further comprising the steps of:
transitioning said direct memory access controller from a wait state to a first execute state in response to said task counter being incremented by said processor; and
decrementing said counter during said transition.

16. The method according to claim 15, further comprising the step of:
transitioning said direct memory access controller from said first execute state to a second execute state in response to said task counter being further incremented by said processor.

17. The method according to claim 16, further comprising the steps of:
transitioning said direct memory access controller from said second execute state to said first execute state in response to finishing said executing of all but one of said tasks; and
decrementing said counter during said transition from said second execute state.

18. An apparatus comprising: means for generating a first signal conveying a new one of a plurality of tasks to a memory; means for generating a second signal that causes a task counter to increment to indicate that said new task is scheduled, wherein said second signal is generated after said new task is stored in said memory; means for executing said new task to transfer data between a plurality of memory locations in response to an absence of a predetermined value in said task counter; means for decrementing said task counter in response to said executing of said new task; means for waiting to receive a next of said tasks in response to said task counter having said predetermined value; and means for asynchronously incrementing said task counter to indicate that an additional one of said tasks is scheduled without monitoring said executing of said new task with said means for generating said first signal.

* * * * *